Figure 1:
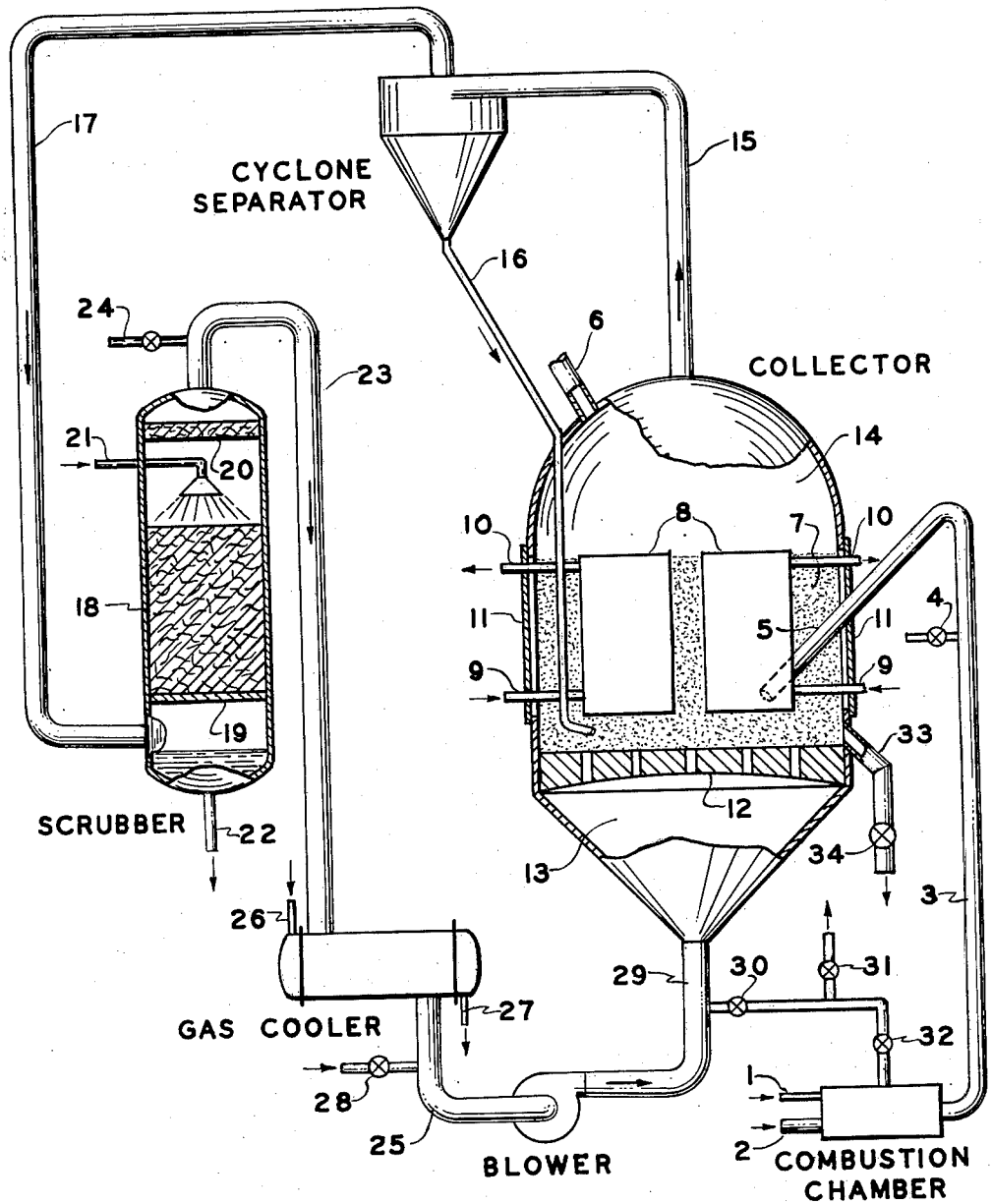

Aug. 13, 1963   G. I. KLEIN ETAL   3,100,693
APPARATUS FOR PROCESSING PHOSPHORIC ACID ANHYDRIDE
Filed June 17, 1960

INVENTORS
GEORGE I. KLEIN
RALPH E. NEWBY
LEO B. POST

BY Lloyd L. Mahone   ATTY.

United States Patent Office 3,100,693
Patented Aug. 13, 1963

3,100,693
APPARATUS FOR PROCESSING PHOSPHORIC ACID ANHYDRIDE
George I. Klein, Park Forest, Ralph E. Newby, Steger, and Leo B. Post, Chicago, Ill., assignors to Stauffer Chemical Company, New York, N.Y., a corporation of Delaware
Filed June 17, 1960, Ser. No. 36,846
4 Claims. (Cl. 23—262)

The present invention is directed to an apparatus for condensing or cooling phosphoric acid anhydride and its reaction products. More specifically, it is directed to an apparatus with means for housing a fluidized bed of finely divided particles and means included therewith for cooling and maintaining a substantially dry atmosphere in said fluidized bed.

The invention is especially applicable to the condensation of phosphoric acid anhydride ($P_2O_5$) from a reaction mixture formed by the oxidation of elemental phosphorus in dry air. This mixture, the initial step in the commercial route to solid $P_2O_5$, is a hot gas having a temperature of 300–600° C. and containing appreciable quantities of air and residual nitrogen. Because $P_2O_5$ is extremely hygroscopic (used often as a dehydrating agent) and a sublimable material, its condensation to the solid form from the aforesaid reaction mixture is a difficult operation to perform efficiently.

Heretofore the principal commercial apparatus for condensing gaseous $P_2O_5$ necessitated its passage through large atmospheric surface condensers or "barns" where particles of solid $P_2O_5$ would form in the cooled gas and grow to sufficient size to precipitate out as a finely divided material. A typical apparatus of the prior art is shown in Chemical Engineering, vol. 61, September 1954, pp. 115–6. Because off-gases from the gaseous mixture were usually discharged to the atmosphere from the surface condensers, the condensing path was necessarily rather long to insure essentially complete recovery of $P_2O_5$. Even with a very long condensing path this apparatus was inefficient, giving usually not more than about 90% of the theoretically expected yield as finely divided $P_2O_5$, and somewhat noncontinuous, requiring frequent shut-down for removal of undesirable $P_2O_5$ crusts which invariably formed about the heat transfer surfaces. These crusts would act as an insulation, decreasing the heat transfer and minimizing the condensing capacity. Because the apparatus was open to the atmosphere substantially dry conditions were hard to maintain and product material was susceptable to considerable degradation. However, probably the most significant disadvantage was the great size and inherent expense of this apparatus necessary for only a small product capacity.

In summary, the foremost problems encountered in commercial production of $P_2O_5$, and generally in the production of related compounds in which $P_2O_5$ is a reactant, include excessive equipment size, loss of product contained in gases vented to the atmosphere, loss of product by its formation as an undesirable crust, difficulties in maintaining continuous production, and difficulties resulting in degrading the product with moisture during condensation. Because of the nature of these problems and the inability of previous apparatus to cope with them, it is easily understood why our apparatus, described below, departs greatly from that used heretofore in this field.

We have now devised an apparatus for continuous condensation of sublimed hygroscopic phosphoric acid anhydride in a substantially dry atmosphere. In addition, the apparatus is suitable for cooling solid hygroscopic $P_2O_5$, even after or during exothermic reaction with another substance. Our apparatus provides means for using the high heat transfer advantage of a fluidized bed to decrease equipment size requirements together with means which make the said fluidized bed suitable for processing hygroscopic materials which require the removal of heat. This apparatus in its basic form contains a fluidized bed with means for recirculating fluidizing gases, thus providing a captive atmosphere which remains substantially dry in what may be called a closed circuit system. In other words the apparatus provides an endless, recirculating dry atmosphere. The preferred embodiment includes means for conditioning the recirculating atmosphere without affecting its dry quality furnishing an apparatus capable of continuous condensation of sublimed phosphoric acid anhydride.

Truly continuous condensation of phosphoric acid anhydride on a large scale in any apparatus requires the removal or prevention of crust formations. Several means are present in the preferred apparatus of this invention for preventing crusts: means are included for removing from the recirculating gases the very small particles which would otherwise deposit on the internal surfaces of the apparatus, the dense fluidized bed used scours the exposed surfaces in the processing zone and maintains them free of crusts, and the location and flow path of the gaseous feed are designed to obviate much of the crusting problem.

The present invention, while very advantageous in the condensation of gaseous $P_2O_5$, is obviously not limited thereto, but may be successfully employed to process a variety of related chemical substances whenever similar problems are encountered. While the best embodiment of the invention now known to us has been selected for presentation in the accompanying drawing, it is to be understood that it is illustrative only, and not limiting, for obvious changes in arrangement, construction and detail can be made without departing from the scope and spirit of the invention.

In the drawing, the apparatus contains a large vertical vessel or chamber for housing a bed of fluidized particles. Hereafter, this unit will be referred to as the "collector." Where used hereafter without further specification, the term "bed" refers to a turbulent bed of fluidized particles. The remaining large units are a combustion chamber, cyclone separator, scrubber, gas cooler and blower. For greater clarity in the description of the invention the units which require no new or involved designs features to be applicable to the invention are shown only schematically. Where a specific function of an element of the apparatus is stated, such function may be explained in terms of its applicability to the condensation of gaseous $P_2O_5$, but no limitations should be implied therefrom since the problems encountered with $P_2O_5$ are generally those which hamper production of its derivatives and related compounds. The method for condensing $P_2O_5$ in the present apparatus is more broadly explained in our copending U.S. patent application Serial No. 21,499.

Our apparatus will now be more fully explained with reference to the drawing which shows a preferred structural embodiment.

Liquid elemental phosphorus enters the combustion chamber through line 1 and is oxidized by dry air entering through line 2. The oxidation product is a gaseous mixture usually containing some excess air necessary to insure complete combustion, the remaining nitrogen from the reacted air, and $P_2O_5$ in the gaseous state. This mixture formed under moderately elevated pressure flows from the combustion chamber through conduit 3 to the collector. To prevent reverse flow in conduit 3, i.e., carry-over of fluidized solids from the collector back to the combustion chamber when the latter is not in operation, several obvious modifications can be used. The combustion chamber can be located above the level of the fluidized bed 7 contained in the collector, or as shown in the drawing, an inverted loop seal can be produced with conduit 3 rising above the bed level, dropping downward thereafter to the point where it contacts the collector wall.

The preferred feed line contains still another modification consisting of an extension 5 which is contiguous with conduit 3 projecting into the interior of the collector and providing a means for feeding the gas directly to the bed at a point away from the collector wall. The most advantageous results are achieved by pointing the extension 5 downward with its opening in the bed positioned about 6 to about 18 inches above the horizontal partition 12. Extension 5 substantially minimized deposition of tacky semi-solid crustations which would ordinarily (with a conventional feed line terminating at the wall) constrict the opening and hamper or even suspend passage of gaseous feed into the fluidized bed. The recirculating system explained hereafter, in combination with the cooled fluidized bed 7, has made it desirable to feed the gaseous $P_2O_5$ directly to the bed and not, as is usually the case with somewhat analogous apparatus, indirectly through the openings in the gas distributing partition 12. This unobvious feed arrangement avoids a serious crusting problem at the feed inlet and is considered a very desirable feature of the invention.

The collector contains a horizontal gas distributing partition 12 with subjacent lower compartment 13 which serves as a windbox for the fluidizing gases, and a superjacent compartment for accomodating a fluidized bed 7. The horizontal gas distributing partition 12 contacts the collector wall around its periphery and contains a plurality of openings for the constricted passage through the partition of a fluidizing gas supplied under pressure to the lower compartment 13. The openings in the horizontal partition must provide even distribution of gases as they rise into the fluidized bed to allow for uniform fluidization of the particles and prevent quiescent zones where localized overheating may occur and disrupt efficient operation. The apparatus contains one or more vertical cooling plates 8, of the type containing interior passages or voids for the circulation of a fluid, located above the horizontal gas distributing grid 12. More precisely, these plates are placed within the bed 7 but may extend slightly into the space above. They serve as means for removing heat. Although no specific arrangement of these plates is necessary, where a large number are used some symmetry is usually desirable. One advantageous arrangement, particularly for a large collector, is to place the plates radially, i.e., with their long horizontal axes falling along lines projected from the center of the bed to its periphery. A cooling fluid, usually water or other liquid enters the vertical plates 8 through conduits 9 and after absorbing heat leaves through conduits 10. Both conduits 9 and 10 pass outside of the collector to their supply and collecting means which are not of sufficient import to this invention to be shown in the drawing. These conduits can be secured to mounting flanges 11 which are bolted to the collector wall. Mounting flanges offer the advantage of providing an air tight seal with an opening at the wall through which the cooling plates and their associated conduits may be conveniently removed from the collector.

For its use as a condenser for a gaseous feed the bed is composed of fluidized solids having the same composition as the normally solid sublimed constituent in the gaseous feed. Thus, in the condensation of gaseous $P_2O_5$ from the phosphorus oxidation mixture mentioned previously the bed is composed of fluidized particles of $P_2O_5$ which act as nuclei for condensation.

A conventional feeder 6 for providing alternate means for feeding the bed is shown only schematically. This feeder may be used during start up to initially charge the collector with a bed of finely divided solids or, during continuous processing, for feeding finely divided solids.

The fluidizing gas supplied to the windbox 13 ascends through the constrictions in the horizontal gas distributing partition 12 and rises through the bed 7. The gases leaving the bed 7 pass upward through a supercontiguous freeboard space 14 and then leave the collector through conduit 15. The large particles suspended in these gases are separated in a cyclone and returned to the bed 7 through dip leg 16. Fluostatic pressure forces finely divided product solids from the bed through conduit 33 which contains a rotary paddle or star type valve 34. Static superatmospheric pressure is preferably used throughout the entire apparatus to eliminate leakage of air into the processing system through improper fittings or any of the conduits connected with the outside atmosphere. Thus moisture is prevented from entering and degrading the hygroscopic product in a manner not anticipated by the prior art equipment of this field.

Very fine particles too small for separation by a cyclone are removed in a wet separator employing a liquor which will not cause appreciable humidification. This wet scrubber may consist as shown in the drawing of a vertical unit with a packed bed 18 wherein the gases are contacted with a suitable liquor. The scrubber liquor need not be completely non-aqueous but should be of suitable composition so that any contained water exerts only a small vapor pressure. To minimize vapor pressure and also to help cool the recirculating gases this liquor may be cooled before use in the scrubber. Since it is often desirable to augment the cooling capacity of the apparatus by external cooling of the fluidizing gases this dual-purpose scrubbing operation can be advantageous. When condensing gaseous $P_2O_5$ superphosphoric or polyphosphoric acid having a $P_2O_5$ content of about 77% is a very suitable scrubber liquor capable of solubilizing and removing essentially all the dispersed $P_2O_5$ from the recirculated gases.

Dispersed particles of $P_2O_5$, if not removed, can be very troublesome in an apparatus such as that of the present invention which employs recirculated gases. The recirculating gases are at a temperature usually much below the condensation point of $P_2O_5$ and any fine dispersed $P_2O_5$ will ordinarily tend to deposit or condense on exposed surfaces. Particularly susceptable to this phenomenon are the blower impeller, constrictions in the gas distributing partition, and heat exchange surfaces outside of the fluidized bed. These can be fouled to an extent requiring a costly and prolonged shut-down for the purpose of cleaning out the apparatus. In view of these difficulties, means for scrubbing the recirculated fluidizing gas is a preferred, if not essential component of our apparatus.

The off-gases leaving the cyclone through conduit 17 enter the scrubber near the bottom thereof ascending through a packed bed of Raschig rings 18 retained upon a conventional support 19. The depth of this packed bed must be adequate to furnish thorough scrubbing and will depend upon the variables involved (type of solvent, temperature, through-put, etc.) in the particular operation. At the top of the scrubber, immediately below the gas exit, a mist screen 20 is positioned adjacent to the walls filling the horizontal cross-section of the unit. Scrubber liquor enters the unit through conduit 21 located between the packing 18 and the mist screen 20, being sprayed downward on the bed through which it flows by gravity. From the bottom of the packing the liquor drips into the bottom of the scrubber vessel from where it is removed through conduit 22. Regeneration equipment may be used in connection with the scrubber liquor but is not important to a description of the present invention and hence is not shown in the drawing. The path of the recirculating gases in the scrubber shown in upward, countercurrent to the descending liquor, leaving the unit through conduit 23 connected at the top thereof.

A cooler for the recirculating gases is not a critical part of the invention but as it can be advantageous in many instances it is shown in the drawing. Principally, the advantage of external cooling lies in its providing additional capacity in the fluidized bed. The cooler fluidizing gases returning to the bed absorb heat as they ascend through the warmer mass augmenting cooling by the vertical plates 8. When desirable to cool the recirculating gases to a rather low temperature the cooling afforded by the use of a cool liquor in the scrubber may prove inadequate. In the drawing the recirculating stream is shown passing into the gas cooler through conduit 23 and leaving through conduit 25 while the cooling fluid enters and leaves this unit through conduits 26 and 27, respectively. A desirable location for the cooler is after the scrubber where the possibility of fouling its heat transfer surfaces is minimized.

A blower, preferably of the positive displacement type, supplies the necessary pressure rise in the recirculating gases to overcome the resistances to gas flow throughout the recirculating system and the collector. A line 28 containing a normally closed valve and connected to conduit 25 functions as an air inlet for start-up. Compressed gases from the blower are delivered through conduit 29 to the lower compartment 13. Conduit means for bleeding-off excess gases from the recirculating stream are shown connecting conduit 29 with the combustion chamber and the atmosphere. The valves 30 and 31 are normally open while valve 32 is normally closed thereby forming a passage for gases to the outside atmosphere. However, under alternate operating procedure bleed-off gases can be recycled back to the combustion chamber. This is accomplished with valves 30 and 32 open and valve 31 either throttled or closed.

The valved lines 4 and 24 connected to conduits 3 and 23, respectively, function as feed lines for introducing gaseous reactants used in the preparation of $P_2O_5$ reaction products and for cleaning the apparatus. Gaseous ammonia may be introduced through lines 4 and 24 for reaction with gaseous or solid $P_2O_5$ to form certain ammonia-phosphorus reaction products, the composition and properties of which depend largely on the physical state of the reacting $P_2O_5$. For example, gaseous ammonia injected through line 4 into a gaseous $P_2O_5$ mixture yields a feed which can be condensed in the collector to give a product substantially identical to Victamide, a complex ammonia-$P_2O_5$ reaction product described in U.S. Patent 2,122,122. Different products are made when gaseous ammonia is reacted with a bed of fluidized $P_2O_5$ particles. To prepare such products ammonia is injected into the recirculating fluidization gases through line 24.

Condensation of a gaseous $P_2O_5$ mixture in the present apparatus gives about 99+% of the theoretical stoichiometric yield as finely divided $P_2O_5$ solids. Virtually all of this is in a usable desirable form free of large spurious particles or crusts of $P_2O_5$. Much of the very small loss is due to solution of $P_2O_5$ in the scrubber liquor and therefore is not truly a loss but a conversion of $P_2O_5$ to a different useful form. Negligibly small losses are attributable to the bleed-off gases or formation of $P_2O_5$ crusts.

Although a combustion chamber is shown in the drawing, it should be apparent that precondensed solids may be sublimed to furnish feed through conduit 3 to the fluidized bed 7. This feed may be diluted with bleed-off gases obtained from conduit 29 through suitable transfer lines or may be condensed in its pure undiluted form obviating bleed-off from recirculating gases entirely. In fact it may be necessary, from a practical standpoint, to admit small amounts of outside air into the recirculating stream through valved line 28 when feeding a totally condensible stream.

The gas recirculating and conditioning means already described is a principal feature of this invention since it offers a way to maintain a substantially dry atmosphere in combination with a fluidized bed adapted to cooling and/or condensing. A preferred apparatus offers a further combination of features producing a device capable of continuous condensation of a gaseous $P_2O_5$ mixture. Continuous condensation requires the correct location of feed, removal of very fine particles from the recirculating gas, bleed-off of the excess gases entering the system with the feed, and other features which will be obvious to those familiar with the art.

Example 1

The method shown in our copending application U.S. Serial No. 21,499, was applied to the condensation of phosphoric acid anhydride vapors, produced by the oxidation of elemental phosphorus in dry air, in the apparatus of the accompanying drawing.

This apparatus consisted of all the components shown in FIGURE I, except for the entrainment screen and gas cooler and used superphosphoric acid (77% $P_2O_5$) as the scrubbing medium. The heat exchange apparatus consisted of two flat plate coils positioned vertically in the bed section to face each other and partially divide the bed into compartments of about equal volume. A pre-established bed of granular phosphoric acid anhydride, made in the same apparatus by a previous run, was expanded to a bed density of about 40 lbs./cu. ft. Fluidization was accomplished with recirculating gases passing up through the dense bed at a velocity of about 0.6 ft./sec. Phosphoric acid anhydride vapor containing 11–170 p.p.m. water vapor was produced in the combustion chamber and transported by conduit to the interior of the fluidized bed near the bottom where it entered at a temperature of about 510°–570° C. City water was circulated through the cooling plates at a rate adjusted to produce a bed temperature of 129°±1° C. Under these conditions concondensation was continued for many hours. A constant flow of $P_2O_5$ vaporous feed was maintained and condensed $P_2O_5$ solids were withdrawn from the bed at about an equivalent rate. At the termination of the run the walls and cooling surfaces in the fluidization chamber and the recirculating system were found to be perfectly clean and free from crusts or scale. The over-all production rate was found to be about 5 lbs./hr./cu. ft. of fluidized bed volume. The product was a free-flowing, virtually dustless form of hexagonal $P_2O_5$ in the shape of small spheres or beads. The bulk density of this material was found to be about 67–74 lbs. per cu. ft.

Example 2

In an apparatus substantially as shown in the drawing a unique $NH_3$—$P_2O_5$ reaction product was prepared. Gaseous ammonia was reacted with precondensed spherical particles of $P_2O_5$ retained and fluidized in the upper compartment of the collector.

Initially the upper compartment of the collector was charged with 600 lbs. of $P_2O_5$ produced by condensation as described in Example 1, above. This bed was fluidized by starting the blower and adjusting the gas rate. In this run the wet scrubber was eliminated, but in similar runs it was used to remove both fine particles and ammonia leaving the bed with the exhaust gases. After a steady state was obtained with the $P_2O_5$ in a dense, turbulent fluidized state and the recirculating gases substantially dry, gaseous ammonia was injected into the recirculating gaseous atmosphere upstream of the blower. A steady flow of ammonia gas was maintained until the recirculating atmosphere contained about 5% by volume of ammonia whereafter additional ammonia was added as required to maintain this level. Contact between the ammonia-containing gases and the $P_2O_5$ particles in the fluidized bed resulted in an exothermic reaction. The bed temperature was held in the range of 100°–170° C. by controlled circulation of cooling water through the vertical plates. Entrained particles were separated from the dilute overhead phase and returned to the bed through the dip leg. Samples of the reaction mass were periodically taken from the bed through the discharge conduit and analyzed for nitrogen content. No additional feed of $P_2O_5$ to the initial 600 lb. bed was allowed until the analyzed material showed about 3% nitrogen by weight. Thereafter, additional $P_2O_5$ was fed through the solids feed line to the upper compartment. The gaseous ammonia feed was continued at its separate location while product solids containing about 3–4% nitrogen were removed from the bed at a rate sufficient to give a constant volume bed. The product of this run was a unique material containing mainly $P_2O_5$ with a uniform, continuous coating of a complex ammonia-$P_2O_5$ reaction product about the outside of the individual $P_2O_5$ particles. This coating serves to delay absorption of water by the very hygroscopic $P_2O_5$ on the interior of the particle. Many uses for materials of this nature are known. It may, for example, be used where a delayed reaction is desirable or where the $P_2O_5$ must be stored in a humid atmosphere for a time, and where the ammonia contained in the particles is non-injurious or helpful in the ultimate use. One specific example of where ammonia and $P_2O_5$ are often combined is in various fertilizer applications.

After the run the entire bed was discharged from the collector and the interior of the unit was inspected. It was found that all surfaces, even those which crusted slightly on previous condensation runs, were free of any scale or crust.

The functions of several of the units shown can be achieved with alternate types of equipment. For example, both mild, wet scrubbing and gas compression can be accomplished in a single unit such as the Nash Hytor Compressor. This unit is a centrifugal displacement compressor with an elliptical casing wherein the recirculating gas can be compressed and at the same time cleaned by contact with numerous droplets of the desired scrubber liquor which fills the interior of the compressor and through which the gas must travel. A wet type dust separator is also adaptable to the apparatus of this invention although it does not allow return of the collected solids to the bed. Heat transfer equipment in the collector and/or recirculating system is subject to considerable modification, e.g., cooling coils may be positioned in the fluidized bed, windbox, or scrubber as an equivalent means for removing heat.

In commercial practices the complete apparatus is very desirably connected in series or parallel with one or more essentially duplicate devices so as to furnish separate collectors for condensing, reacting, and even cooling materials in a dry atmosphere.

Many variations and modifications are within the scope and spirit of this invention, and therefore, no unnecessary limitations should be understood from the above specification.

We claim:
1. An apparatus for condensing gaseous phosphoric acid anhydride which comprises in combination:
   (A) A vessel divided into upper and lower compartments by a horizontal gas distributing partition, said upper compartment serving to house a dense fluidized bed of cooled $P_2O_5$ particles and said lower compartment serving as the fluidization windbox;
   (B) Conduit means for furnishing a gaseous feed of $P_2O_5$ directly to the dense fluidized bed and connected through the wall of said vessel below the upper level of said dense fluidized bed and at a position where said gaseous feed will enter said dense fluidized bed at least six inches above the horizontal gas distributing partition;
   (C) Valved conduit means for discharging condensed particles of $P_2O_5$ under fluostatic pressure from said dense fluidized bed and connected through the wall of said vessel at a position within said upper compartment below the upper level of said dense fluidized bed;
   (D) A recirculating and conditioning system for exhausted gases from said dense fluidized bed comprising conduit means connected to said vessel near the top and bottom thereof furnishing an endless flow path outside of said vessel in which a sufficient quantity of said exhausted gases to support fluidization may be recycled from said dense fluidized bed to said windbox, and dust separating means comprising a wet scrubber for separating suspended particles of $P_2O_5$ contained in said exhausted gases positioned within said endless flow path;
   (E) Heat transfer means for removing heat from said dense fluidized bed of $P_2O_5$ particles to maintain the required condensing temperature therein and positioned within said upper compartment with substantially all of the heat transfer surfaces below the upper level of said dense fluidized bed; and
   (F) Valved conduit means for bleeding off excess gases from said apparatus.

2. The apparatus of claim 1 wherein the gaseous feed conduit means project downward into the interior of the fluidized bed and terminate within an opening substantially removed from the vessel walls and about six to eighteen inches above the horizontal gas distributing partition.

3. The apparatus of claim 1 wherein supplementary heat transfer means are provided within the recirculating and conditioning system for cooling the recycled gases.

4. The combination consisting of the apparatus of claim 1 with a combustion chamber for oxidizing elemental phosphorus and linked to the apparatus through the gaseous feed conduit means.

References Cited in the file of this patent

UNITED STATES PATENTS

| | | |
|---|---|---|
| 2,168,312 | Baily | Aug. 8, 1939 |
| 2,847,360 | Henninger et al. | Aug. 12, 1958 |
| 2,912,315 | Haney | Nov. 10, 1959 |
| 2,988,426 | Cross et al. | June 13, 1961 |

FOREIGN PATENTS

| | | |
|---|---|---|
| 728,980 | Great Britain | Apr. 27, 1955 |

OTHER REFERENCES

Sittig: Article in Chemical Engineering, May 1953, pages 219–231, 23–1F. (Copy in Sci. Lib., U.S.P.O.)